ોR 4,149,775

United Sta

Blake

[11] 4,149,775

[45] Apr. 17, 1979

[54] ZOOM LENS APPARATUS WITH ADJUSTABLE APERTURE

[76] Inventor: Daniel H. Blake, 128 Crooked Hill Rd., Huntington, N.Y. 11743

[21] Appl. No.: 821,478

[22] Filed: Aug. 3, 1977

[51] Int. Cl.² .............................. G02B 15/14
[52] U.S. Cl. .................... 350/187; 353/101
[58] Field of Search ............. 350/187, 255, 44; 354/196; 352/140, 141; 353/97, 76, 101

[56] References Cited
U.S. PATENT DOCUMENTS

| 2,924,146 | 2/1960 | Back | 350/187 |
| 3,541,941 | 11/1970 | Barr | 350/187 |
| 3,610,733 | 10/1971 | Back | 350/187 |
| 3,896,466 | 7/1975 | Korpert | 350/255 |

Primary Examiner—Jon W. Henry
Attorney, Agent, or Firm—Robert D. Farkas

[57] ABSTRACT

A remotely controlled projection zoom lens apparatus utilizes a zoom lens assembly having a spur gear fitted to the barrel element of a zoom lens rotationally driving a zoom lens element. Another spur gear is co-axially aligned with an iris element operable in line with the zoom lens assembly. Both spur gears are in turn operated by a gear train and powered by a common motor. A slip clutch may be interposed between the motor output shaft and the gear train or between the gear train and either or both spur gears, permitting the iris barrel or zoom barrel to engage stop position without damage when one or the other is driven to a stop position by the motor, or to adjust angular position relative to one another. The gear train is rotationally coupled to a potentiometer, which in turn signals the position thereof to a remotely located indicating device. The motor is controlled from the remote location as well. Images may be projected through the zoom lens from conventional slide projectors so as to have the displayed projection maintained at a constant light density regardless of the size of the displayed image.

11 Claims, 5 Drawing Figures

ZOOM LENS APPARATUS WITH ADJUSTABLE APERTURE

BACKGROUND OF THE INVENTION

1. The Field of the Invention

This invention relates to optically operated display equipment and more particularly of that class utilized to project images of varying sizes and at varying light intensities.

2. Description of the Prior Art

The prior art abounds with apparatus utilized to control camera or projection objects or parts thereof. U.S. Pat. No. 3,482,500 issued on Dec. 9, 1969 to O. Thomas teaches a control mechanism for a camera objective employing a motor rotationally coupled to a gear train which in turn engages a gear-like peripheral surface of a barrel of a zoom lens assembly. The barrel is utilized to vary the position of a lens. The patent to Thomas does not disclose any attempt to utilize the same or another motor to control an iris portion of the zoom lens apparatus.

U.S. Pat. No. 2,924,146 issued on Feb. 9, 1960 to F. G. Back discloses three elements of a zoom lens assembly, two being lenses and the third being an iris mechanism, rotationally coupled to independently operated motors by way of spur gears affixed about the barrels of the zoom lens apparatus. The teachings of Back, though applicable in concept to that of the present invention, fails to provide convenient simultaneous adjustment of the iris and zoom lens assembly and when utilizing remote control apparatus, fails to adequately signal an operator as to the size of the display image and the intensity thereof.

U.S. Pat. No. 3,889,282 issued on June 8, 1975 to S. Hashimoto discloses an interchangeable zoom lens having front and rear axially movable optical systems arranged so that they can be moved in opposite directions so as to vary the focal length, to wit, zooming, the front system being independently movable for focusing by means of a distance ring projecting forward providing a lens hood effect. The zooming control superimposes a displacement on the preset adjustment of the aperture by the aperture preset ring, and also modifies the maximum open position of the aperture adjustment mechanism. The teachings of Hashimoto, although utilizing a manually rotated zoom assembly, adapted primarily for use in cameras is radically different from the apparatus taught in the present invention, in that the aperture or iris assembly, of the present invention, is simultaneously varied whilst the focal length of the zoom lens apparatus thereof is being altered. The present invention however, teaches that the relative aperture size and the focal length may be altered in relationship to one another by having either the iris assembly or the zoom assembly cease rotation upon engagement with a stop element whilst permitting the remaining element to be varied, leading to a change in focal length without a change in aperture size, or conversely, a change in aperture size without a change in focal length.

SUMMARY OF THE INVENTION

A primary object of the present invention is to provide a projection apparatus capable of displaying images of variable size whilst having a constant light density regardless of the size of the displayed image.

Another object of the present invention is to provide an image projector lens and iris system which may be remotely operated and which may signal the size of the image to the operator, or a measure of the light intensity of the image.

Still another object of the present invention is to provide a zoom lens and iris apparatus suitable for use with conventional slide projectors so as to display the entire slide in a display area of selected sizes.

Yet another object of the present invention is to provide a control apparatus for a slide projector lens system which enables an operator to preselect image display sizes and intensities before and during the time the image is being projected.

Zoom lens systems are employed to change the focal length of a lens system so as to provide close-up or distance images at will when the apparatus is utilized in conjunction with a camera. Conversely, when utilized in conjunction with a projector, the absolute size of the image displayed on a screen located a fixed distance away from the lens system, is varied in accordance with the positioning of a lens group within the zoom lens apparatus. When the displayed image is large, a constant light intensity provided to project a slide onto the display area, may be too low because of the size of the display image. When the display image is reduced in size, whilst employing the same light intensity as a light source, the light density of the display image is increased. When the display image is sufficiently small, the light density of the display may be too intense. The present invention overcomes these problems by varying the aperture of an iris assembly co-axially aligned with the zoom apparatus, and installed intermediate the light source and zoom apparatus. This is accomplished by gearing together the movable lens group and the iris so as to be operated by a common motor. The arrangement of the gearing is such that as the zoom lens focal length decreases, that is the display image size increases, the display image light density increases, that is the aperture increases, in direct proportion to one another. The net effect is to maintain a constant brightness per unit area of the displayed or projected image.

A clutch may be interposed between a motor and a gear train capable of simultaneously rotating and thereby adjusting the moving lens group and the iris assembly. The clutch is utilized in this location to prevent damage to the apparatus when either the movable lens group or the iris apparatus have reached their maximum travel limits. The same or another clutch may be interposed between the gear train and the movable lens group, or if desired, the iris apparatus. This clutch device permits one of the movable elements to continue to move whilst the other movable element is held fast at its travel limit stop mechanism. During such times the ratio of focal length over aperture size is varied. Reversing the direction of the motor, now enables the moving lens group and the iris apparatus to operate simultaneously but at a new ratio of focal length to aperture size. It should be noted that a single motor is employed at all times. The same motor is used such that the image displayed, during those times that the focal length and the aperture size are simultaneously varied, maintains a constant ratio of focal length to aperture size. Additionally, the same motor is utilized to alter the ratio when either the movable lens group or the iris apparatus have reached their limit of travel. Judicious choice of gear train ratios at the dual output shafts thereof and the total rotational travel capabilities of the movable lens group and the iris apparatus, enables a user to pseudo-permanently "trim" the ratio during a minor portion of the rotational travel of the gear train, and at either limit of image display size.

Because the ratio of focal length to aperture size, or the ratio of display image size to light density, is substantially constant over a major protion of the movable range of the motor output shaft, an operator may predetermine the size of the image to be displayed before the projector lamp is energized. The operator is assured that the image density is proper for the size of the image to be displayed. Remote indicating devices, such as a milliameter, may be energized in accordance with the angular position of either output shaft of the gear train. If desired, angular position of both output shafts may be detected and displayed at the remote location of the operator. This serves to inform the operator when one of the movable elements, either the movable lens group or the iris apparatus, has ceased to rotate whilst the other continues to be driven by the motor.

These objects, as well as other objects of the present invention, will become more readily apparent after reading the following description of the accompanying drawings.

DESCRIPTION OF THE PREFERRED EMBODIMENT

Figure 1:
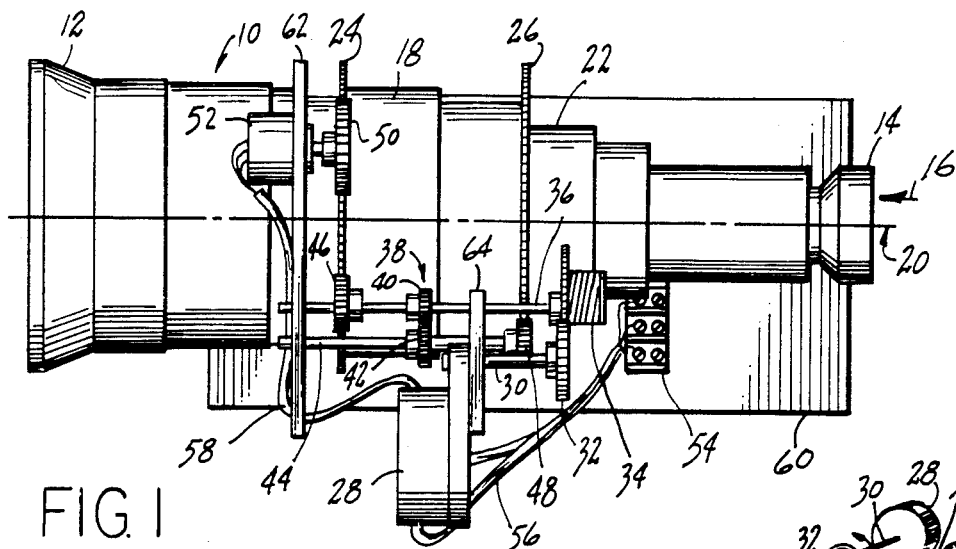
FIG. 1 is a plan view of the present invention.
Figure 3:
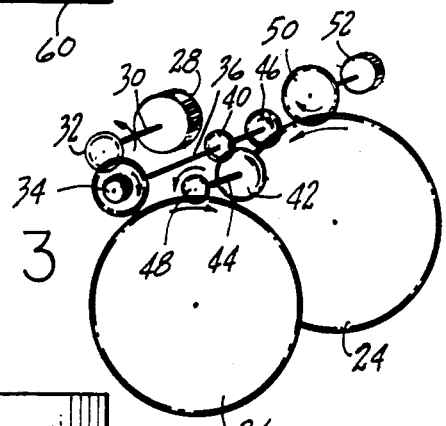
FIG. 3 is a perspective view of the rotational components of the apparatus depicted in FIG. 1.

The structure and method of fabrication of the present invention is applicable to a zoom lens device, of design well known to those skilled in the art, having a movable lens group which when moved rotationally causes the focal length of the zoom apparatus to be changed. Such devices include stops incorporated such that the movable lens group may be operated only over a limited range by rotating a barrel, in a likewise limited rotational range, located in the vicinity of the movable lens group. An iris apparatus may be incorporated with the zoom lens device so as to have the aperture located co-axially aligned with the lens system of the zone apparatus. The iris apparatus is oft-times provided with a barrel, which when rotated causes the aperture size to increase or decrease up to the limits of rotationability of the iris barrel. The present invention utilizes a pair of spur gears, each of which are mounted co-axially with the barrels controlling the movable lens group and the aperture size. A gear train having a pair of output shafts and a gear affixed to each output shaft, mesh with the spur gears such that the gear train is rotated, both the barrel operating the movable lens group and the barrel controlling the iris aperture size move simultaneously during those periods of time that the movable lens group and the iris apparatus are not engaged with the stop devices limiting their adjustment. A motor is rotationally coupled to the input shaft of the gear train by way of a slip clutch. A potentiometer is rotational coupled to either the barrel controlling the movable lens group, or the barrel controlling aperture size.

In an alternate embodiment, an additional slip clutch may be interposed between the output shaft normally driving the spur gear on the movable lens group barrel and the spur gear of the movable lens group barrel. Thus, when the movable lens group barrel is held incapable of further rotation, by the stop elements associated therewith, the iris aperture adjustment barrel is capable of being rotated by the gear train. Obviously, the clutch driven directly by the motor, must be such that it does not slip before the clutch on the output side of the gear train slips. This enables the motor to be positively coupled to the gear train, causing the rotation thereof, whilst the movable lens group barrel is stalled at a limit or stop position and while the iris apparatus is undergoing adjustment by being driven by the motor. Alternatively, still another slip clutch may be installed between the other output shaft of the gear train and the barrel driving the iris apparatus. The last mentioned slip clutch may be utilized with or without the slip clutch on the spur gear of the movable lens group barrel.

The potentiometer may be used to operate a milliameter whose scale is calibrated in either display image sizes or focal length. Another potentiometer may be coupled to the barrel operating the iris apparatus which in turn is electrically coupled to the same or another milliameter having a scale calibrated in units of light intensity. A selector switch may be employed to transfer the terminals of a single milliameter to the terminals of either potentiometer.

The apparatus of the present invention may be used in conjunction with a zoom lens assembly having 400° of rotation for the barrel controlling the movable lens group. The barrel controlling aperture size may be free to freely rotate within 300°. The concurrent free rotation of both barrels, if positively geared together, is thus limited to 300°. The inclusion of a slip clutch on the iris operating barrel, permits the lens group operating barrel to be operated through 400° of operation, even during those periods of time that the iris adjustment barrel is stalled. When the motor direction is reversed from the direction which caused the iris adjustment barrel to come into contact with the iris adjustment barrel, both the iris adjustment barrel and the movable lens group barrel will rotate simultaneously. By successive adjustments at the extreme ends of the iris adjustment barrel travel, the movable lens group barrel can be angularly shifted relative to the iris adjustment barrel, 100°.

Now referring to the Figures and more particularly to the embodiment illustrated in FIGS. 1 through 4, showing a zoom lens apparatus 10 having an output shield 12 and an input hood 14, when light enters through hood 14 in the direction of arrow 16. Barrel 18 is journalled so as to be coaxially aligned with longitudinal axis 20, and controls a movable lens group, not shown, within zoom lens 10. Barrel 22 is journalled so as to be co-axially aligned with longitudinal axis 20 and barrel 18 and controls the aperture size of an iris apparatus, not shown, located within zoom apparatus 10. The aperture is also co-axially aligned with longitudinal axis 20. Spur gear 24 and spur gear 26 are secured to barrels 18 and 22 respectively, each being co-axially aligned with longitudinal axis 20. Motor 28, being of the direct current variety, is provided with an output shaft 30 which operates gear 32. Slip clutch 34 couples gear 32 to the input shaft 36 of gear train 38. Gear 40, carried by shaft 36, is rotationally coupled to gear 42, operating shaft 44. Input shaft 36 carries gear 46, which in turn is coupled to spur gear 24. Shaft 44 also carries gear 48 which in turn is rotationally coupled to spur gear 26. Gear 50 engages gear 24 and operates patentiometer 52.

Terminal board 54 carries wires 56, from motor 28, and wires 58, from potentiometer 52. Plate 60 serves as a support for plates 62 and 64, wherein both plates 62 and 64 serve to provide bearings for shafts 36 and 44, mounting surfaces for motor 28 and patentiometer 52 and mounting surfaces for zoom assembly 10.

Figure 5:
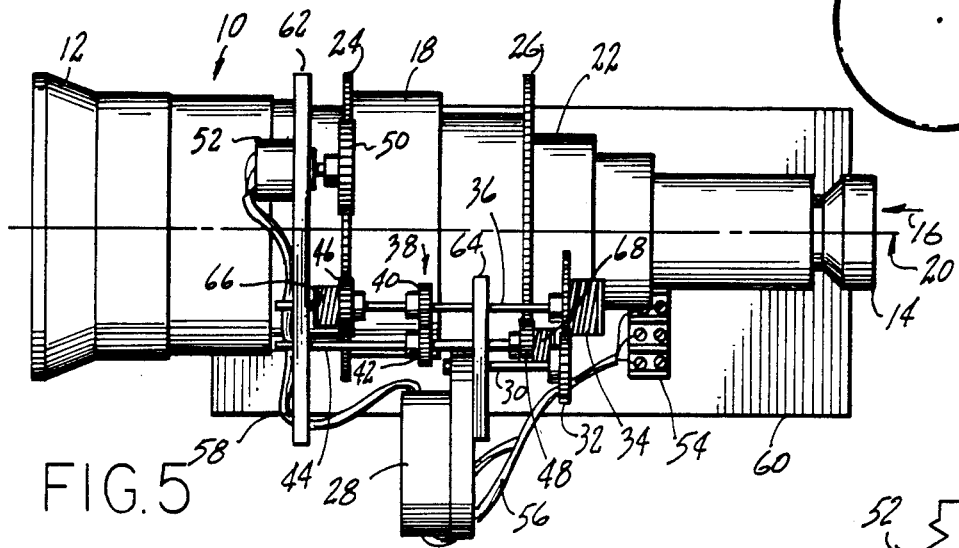
FIG. 5 is an alternate embodiment of the apparatus shown in FIG. 1.
Figure 4:
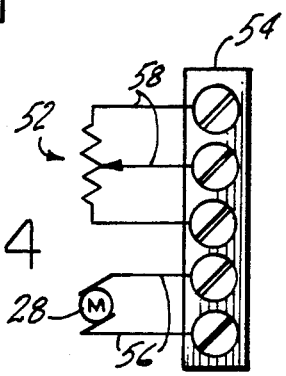
FIG. 4 is a wiring diagram of the electrical components shown in FIG. 1.
Figure 2:
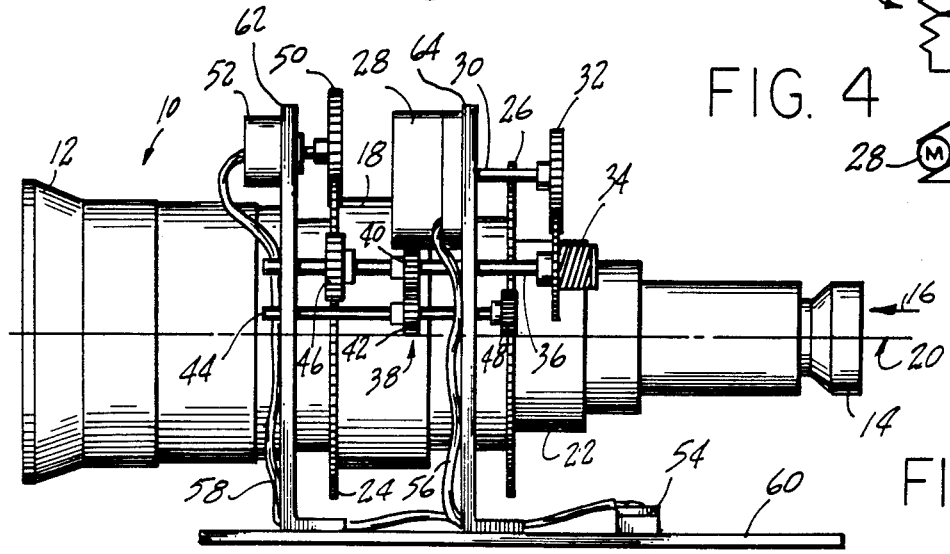
FIG. 2 is a side elevation view of the present invention.

FIG. 5 illustrates an alternate embodiment of the apparatus depicted in FIGS. 1 through 4, wherein an additional slip clutch 66 is shown operated by shaft 36 so as to control the rotationability of gear 46. Gear 46 is coupled to spur gear 24. Thus, when barrel 18 is free to rotate unlimitedly, in any given direction, the rotation of shaft 36 causes spur gear 24 to rotate. When barrel 18 has reached a stop limit, by means not shown, shaft 36 is able to continue rotation by the slipping action of slip clutch 66. If desired, still another slip clutch 68 may be installed so as to limit the rotationability of barrel 22, which carries spur gear 26, relative to shaft 44, carrying gear 48. Thus, either or both barrels 18 and 22 may slip relative to one another, when either barrel is engaged in a limited stop position. Furthermore, both barrels are frictionally coupled to motor output shaft 30 by the use of slip clutch 34.

One of the advantages of the present invention is a projection apparatus capable of displaying images of variable size whilst having a constant light density regardless of the size of the displayed image.

Another advantage of the present invention is an image projector lens and iris system which may be remotely operated and which may signal the size of the image to the operator, or a measure of the light intensity of the image.

Still another advantage of the present invention is a zoom lens and iris apparatus suitable for use with conventional slide projectors so as to display the entire slide in a display area of selected sizes.

Yet another advantage of the present invention is a control apparatus for a slide projector lens system which enables an operator to preselect image display sizes and intensities before and during the time the image is being projected.

Thus, there is disclosed in the above description and in the drawings, an embodiment of the inventon which fully and effectively accomplishes the objects thereof. However, it will become apparent to those skilled in the art, how to make variations and modifications to the instant invention. Therefore, this invention is to be limited, not by the specific disclosure herein, but only by the appending claims.

I claim:

1. The combination of a zoom lens apparatus, the zoom lens apparatus having a first rotational barrel for adjustment of the focal length thereof, the first barrel being stopped in rotationability when rotated a sufficient amount in a clockwise and counter-clockwise direction, an aperture, the aperture co-axially aligned with the optical axis of the zoom lens apparatus, a second barrel, the second barrel controlling the size of the aperture when the second barrel is rotated, the second barrel being stopped in rotationability upon being rotated a sufficient amount in a clockwise and a counter-clockwise direction, the improvement comprising a motor, a gear train, the gear train having an input shaft and a pair of output shafts, the input shaft being rotatably coupled to the motor, said pair of output shafts and said input shaft rotationally coupled together by said gear train for continuous simultaneous rotation when said input shaft is continuously rotated by said motor, one of the pair of output shafts being rotatably coupled to the first barrel, the other of a pair of output shafts being rotatably coupled to the second barrel.

2. The apparatus as claimed in claim 1 further comprising a slip clutch, the slip clutch being located between the input shaft of the gear train and the motor.

3. The apparatus as claimed in claim 1 further comprising a slip clutch, the slip clutch being located between said one of said pair of output shafts and said first barrel.

4. The apparatus as claimed in claim 1 further comprising a slip clutch, said slip clutch being located between said other of said pair of output shafts and said second barrel.

5. The apparatus as claimed in claim 1 further comprising a potentiometer, said potentiometer having a driving shaft, said driving shaft rotationally coupled to said first barrel.

6. The apparatus as claimed in claim 1 wherein said motor is operated by direct currents.

7. The apparatus as claimed in claim 5 further comprising a first plate, said first plate having a second and third plate affixed to one lateral surface thereof, said second and said third plates being disposed in parallel spaced apart relationship, said second plate carrying said motor, said third plate carrying said potentiometer, said input shaft of said gear train being journalled to said third plate.

8. The apparatus as claimed in claim 1 further comprising a pair of spur gears, one of said pair of spur gears being carried by said first barrel and co-axially aligned therewith, the other of said pair of spur gears being carried by said second barrel and co-axially aligned therewith.

9. The apparatus as claimed in claim 2 wherein said slip clutch rotationally decouples said motor from said input shaft when either said first or said second barrels are incapable of rotation.

10. The apparatus as claimed in claim 3 wherein said slip clutch rotationally decouples said first barrel from said second barrel and said input shaft when said first barrel is incapable of rotational motion.

11. The apparatus as claimed in claim 4 wherein said slip clutch rotationally decouples said second barrel from said first barrel and said input shaft when said second barrel is incapable of rotational motion.

* * * * *